Patented July 4, 1944

2,353,049

UNITED STATES PATENT OFFICE 2,353,049

PROCESS FOR PREPARING 6-Bz-1-DIBROMOBENZANTHRONE

Henry R. Lee, Pitman, and Clarence F. Belcher, Bridgeton, N. J., assignors to E. I. du Pont de Nemours & Company, Wilmington, Del., a corporation of Delaware No Drawing. Application November 13, 1942, Serial No. 465,486

6 Claims. (Cl. 260—352)

This invention relates to an improvement in the process for preparing 6-Bz-1-dibromobenzanthrone, and more particularly to a method for isolating the 6-Bz-1-dibromobenzanthrone in a state of high purity and in relatively high yields from the organic solvent in which it is formed.

6 - Bz - 1 - dibromobenzanthrone, produced by bromination of benzanthrone in organic solvents such as nitrobenzenes, chlorobenzenes, etc., is difficult to obtain in pure form due to the formation of substantial amounts of isomers and partially brominated bodies during the bromination reaction. Where the dibromobenzanthrone is purified by repeatedly recrystallizing from organic solvents such as nitrobenzene, considerable loss in yield is experienced due to some solubility of the dibromobenzanthrone in the organic solvents.

It is therefore an object of the present invention to provide a simple and economical process for isolating 6-Bz-1-dibromobenzanthrone from the organic solvent in which it is produced, and which will give the 6-Bz-1-dibromobenzanthrone in a state of high purity and in relatively high yields.

We have found that when benzanthrone is brominated in organic solvents such as nitrobenzene, dichlorobenzenes, etc., by the methods disclosed in the prior art, the 6-Bz-1-dibromobenzanthrone can be separated from the organic solvent and the normally occurring impurities by extracting the 6 - Bz - 1 - dibromobenzanthrone from the solution with sulfuric acid of from 78% to 88% concentration. The extraction may be carried out by running the organic solvent bromination mass into sulfuric acid of from 78% to 88% strength, or by adding it to concentrated sulfuric acid and adjusting the acid concentration so that the sulfuric acid in the mass is of a concentration from 78% to 88% acid. We have found that in sulfuric acid of from 78% to 88% strength, the impurities including the isomeric halogenated compounds, remain dissolved while the 6-Bz-1-dibromobenzanthrone separates out as a slurry of reddish-brown crystals which appears to be the oxonium sulfate of the 6-Bz-1-dibromobenzanthrone. The mass is then filtered and the oxonium sulfate is hydrolyzed to the 6-Bz-1-dibromobenzanthrone with water, preferably during a steam distillation, to remove any adhered solvent from the filter cake.

By this process the minimum amount of solvent can be employed in the bromination step, because the removal of impurities normally occurring in the resulting bromination mass will not be dependent upon the large excess of solvent normally employed, but is, instead, dependent more particularly upon the concentration of sulfuric acid employed in the extraction step. The yield of dibromobenzanthrone by this process is, of course, mainly dependent upon the efficiency of the bromination step. By employing sulfuric acid to extract the 6-Bz-1-dibromobenzanthrone, the yield of the desired product in a state of high purity is usually increased because there is less loss of the desired 6-Bz-1-dibromobenzanthrone in the large excess of organic solvent that must otherwise be employed, either in the bromination step or in subsequent recrystallizations that must be carried out where smaller amounts of organic solvent are employed in the bromination reaction.

While the extraction of the 6-Bz-1-dibromobenzanthrone according to the present invention is preferably coupled with the bromination of the benzanthrone by the process more particularly described in U. S. Patent 2,180,835 to Perkins & Deinet, it will be obvious that the process is applicable to other processes for brominating benzanthrone in organic solvents. This process is based upon our discovery that the 6-Bz-1-dibromobenzanthrone forms an insoluble compound which appears to be the oxonium sulfate in sulfuric acid of from 78% to 88%, coupled with the fact that the normally occurring impurities, such as isomeric dibromo compounds, monobromo compounds and some chlorobromo derivatives, remain soluble in acid of this concentration or in the organic solvent. It will therefore be obvious, as more particularly illustrated by the following examples, that the dibromobenzanthrone produced by bromination in organic solvents, can also be purified, after isolation from the organic solvent, by slurrying or dissolving the crude brominated filter cake in concentrated sulfuric acid and then reducing the acid concentration to from 78% to 88%. The extraction, however, is preferably caried out prior to isolation of the dibromobenzanthrone from the bromination mass, for to some extent the impurities that are occluded in the dibromobenzanthrone, as it is crystallized from the organic solvent, are eliminated if the dibromobenzanthrone is extracted with the sulfuric acid prior to isolation. The yields are also somewhat increased, because by the combined process less organic solvent need be employed in the bromination step, whereby less dibromobenzanthrone is carried out in solution in the filtrate during the isolation from the solvent.

The following examples are given to illustrate the invention. The parts used are by weight.

Example 1

Following the general procedure of U. S. Patent 2,180,835, 100 parts of benzanthrone are stirred into 300 parts of dry nitrobenzene and heated to 80°–85° C., at which temperature the benzanthrone is dissolved. Two parts of iodine are added and a mixture of 78 parts of liquid bromine with 65 parts of sulfuryl chloride are added, preferably under the surface, over a period of several hours. When the addition of the brominating agent is complete the reaction mass is maintained on temperature a few hours longer, or until analysis of a sample indicates the introduction of two atoms of bromine into the benzanthrone molecule. The warm reaction mass is then dropped directly into a vented vessel containing 1000 parts of 82.5±0.5% sulfuric acid heated at 100±5° C. After stirring for one-half to one hour at 100±5° C., the charge is cooled to 25°–30°. Microscopic inspection shows reddish-brown needle-like crystals. The cooled charge is filtered on a stone or carborundum filter and the crystalline residue washed with 82% sulfuric acid. The reddish-brown residue is hydrolyzed in hot water to a bright greenish-yellow precipitate which is filtered off, washed free from acid and dried. The 6-Bz-1-dibromobenzanthrone thus obtained, although it contains traces of chlorine, is of relatively high purity, having a melting point of 257°–258° C.

Example 2

100 parts of benzanthrone in 400 parts of dry orthodichlorobenzene are stirred and heated at 80°–85° C. Two parts of iodine are added and then a mixture of 78 parts of liquid bromine and 65 parts of sulfuryl chloride are slowly added under the surface of the charge over a four hour period while maintaining the temperature at 80°–85° C. Stirring and heating are continued an additional sixteen hours. The warm reaction mass is poured into 1000 parts of 83% sulfuric acid heated at 90° C. After stirring one-half hour at 90°–100° C., the charge is cooled to ordinary temperature and filtered on a carborundum plate. The residue is washed with 83% sulfuric acid and then hydrolyzed in hot water. The resultant greenish-yellow crystalline product is 6-Bz-1-dibromobenzanthrone of high purity, melting at 257°–258° C.

Example 3

50 parts of pure benzanthrone are covered with 250 parts of liquid bromine according to the disclosure of British Patent 20,837/06 and allowed to stand twenty-four hours. The nearly solid mass is loosened and partly dissolved by adding 200 parts of nitrobenzene and warming at 80°–85° C. The warm mass is poured into 500 parts of 82.5% sulfuric acid heated at 100° C. for one hour. The charge is cooled to room temperature and filtered on stone or carborundum. The residue is washed with 250 parts of 82.5% $H_2SO_4$, then hydrolyzed in hot water. The yellow crystalline product is 6-Bz-1-dibromobenzanthrone of high purity, having a melting point of 259°–259.5° C. It contains 42% bromine.

Example 4

To a mixture of 250 parts of dry nitrobenzene, 100 parts of pure benzanthrone and 2 parts of iodine, stirred and heated at 80° C., there is added a mixture of 78 parts of liquid bromine with 65 parts of sulfuryl chloride over eight to ten hours. The reaction mass is maintained at 80°–85° C. for an additional eight hours and then dropped into 860 parts of 96% sulfuric acid. This solution is warmed to 95°–100° C. and diluted gradually with 135 parts of water at that temperature, reducing the sulfuric acid content to 83%. Large reddish-brown needle-like crystals are formed. The charge is cooled and filtered on stone or carborundum and the reddish-brown crystallized residue is washed with 500 parts of 82% sulfuric acid. The residue is hydrolyzed in hot water in the presence of a small amount of alkaline bisulfite. The hydrolysis is preferably carried out in a steam still in order to recover a small portion of nitrobenzene in the cake. The 6-Bz-1-dibromobenzanthrone thus obtained melts at 258°–259° C.

Example 5

100 parts of crude dry dibromobenzanthrone, prepared according to the method of British Patent 20,837/06 or U. S. Patent 2,180,835, is dissolved in 1000 parts of 93% sulfuric acid while warming to 75°–80° C. The solution is gradually diluted with 165 parts of water while letting the temperature rise to 100±5° C. and then maintaining this temperature until dilution is complete. After cooling to ordinary temperature, the slurry of reddish-brown crystalline material is filtered on stone and washed with 500 parts of 84.5±0.5% sulfuric acid. The residue is hydrolyzed in water to give 6-Bz-1-dibromobenzanthrone melting at 258°–259° C.

The use of sulfuric acid, as described above, provides a simple and economical process for the isolation of 6-Bz-1-dibromobenzanthrone of high purity. While sulfuric acid of a concentration above 88% may be used, it tends to decrease the yields obtained due to the increasing solubility of the desired 6-Bz-1-dibromobenzanthrone in higher strength acid. The use of lower concentrations than 78% tends to precipitate out undesirable by-products and thereby give a less pure 6-Bz-1-dibromobenzanthrone. While the limits of acid concentrations are therefore not sharp, the preferred concentrations which have been found to give high yields of the 6-Bz-1-dibromobenzanthrone of high purity are those from 78% to 88%.

The process not only obviates the use of the expensive and less readily available organic solvents, but it permits the separation of 6-Bz-1-dibromobenzanthrone from the organic solvents in which it is formed with little loss of the 6-Bz-1-dibromobenzanthrone, and permits this product to be obtained in exceptionally high purity. It will be noted in the above examples that the products obtained have a melting point even slightly higher than that listed in the literature for pure 6-Bz-1-dibromobenzanthrone. The process not only permits the use of less expensive materials in the purification step, but materially reduces the operating time and costs in avoiding the laborious solvent extractions heretofore employed in the purification of this product.

We claim:

1. In the process for preparing 6-Bz-1-dibromobenzanthrone wherein the crude bromination product is suspended in an organic solvent, the steps which comprise extracting the organic solvent suspension of the crude 6-Bz-1-dibromobenzanthrone with sulfuric acid of from 78% to 88% concentration, filtering the organic solvent-sulfuric acid slurry and hydrolyzing the resulting insoluble reddish-brown crystalline residue with water.

2. In the process for preparing 6-Bz-1-dibromobenzanthrone wherein benzanthrone is brominated in an inert organic solvent, the steps which comprise extracting the organic solvent suspension of the crude 6-Bz-1-dibromobenzanthrone with sulfuric acid of from 78% to 88% concentration, filtering the organic solvent-sulfuric acid slurry and hydrolyzing the resulting insoluble reddish-brown crystalline residue with water.

3. In the process for preparing 6-Bz-1-dibromobenzanthrone wherein benzanthrone is brominated in an inert organic solvent, the steps which comprise isolating the 6-Bz-1-dibromobenzanthrone from the bromination mass by extracting the mass with sulfuric acid of from 78% to 88% strength, filtering, washing the filter cake with sulfuric acid of from 78% to 88% strength and hydrolyzing the resulting insoluble reddish-brown crystalline residue by slurrying it in hot water, filtering the resulting 6-Bz-1-dibromobenzanthrone and washing it acid-free with water.

4. The process for preparing 6-Bz-1-dibromobenzanthrone which comprises reacting benzanthrone in an organic solvent with sufficient bromine to effect dibromination of the benzanthrone, the bromination being carried out in the presence of an amount of sulfuryl chloride molecularly equivalent to the bromine employed, extracting the bromination mass with sulfuric acid of from 78% to 88% strength, filtering off the resulting insoluble reddish-brown crystalline residue and hydrolyzing the same with water to give the 6-Bz-1-dibromobenzanthrone in a state of high purity.

5. In the process for preparing 6-Bz-1-dibromobenzanthrone wherein benzanthrone is brominated in an inert organic solvent, the steps which comprise extracting the organic solvent suspension of the crude 6-Bz-1-dibromobenzanthrone with sulfuric acid of from 82% to 85% concentration, filtering the organic solvent-sulfuric acid slurry and hydrolyzing the resulting insoluble reddish-brown crystalline residue with water.

6. In the process for preparing 6-Bz-1-dibromobenzanthrone of relatively high purity, the steps which comprise extracting the crude 6-Bz-1-dibromobenzanthrone with sulfuric acid of from 78% to 88% strength, and isolating the resulting insoluble reddish-brown crystalline 6-Bz-1-dibromobenzanthrone sulfuric acid addition product and hydrolyzing it with water.

HENRY R. LEE.
CLARENCE F. BELCHER.